United States Patent
Krah

(10) Patent No.: US 9,300,951 B2
(45) Date of Patent: Mar. 29, 2016

(54) AUTOSTEREOSCOPIC PROJECTION DISPLAY DEVICE WITH DIRECTIONAL CONTROL BASED ON USER'S LOCATION

(75) Inventor: Christoph H. Krah, Los Altos, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 12/687,829

(22) Filed: Jan. 14, 2010

(65) Prior Publication Data

US 2010/0118118 A1     May 13, 2010

Related U.S. Application Data

(62) Division of application No. 11/533,580, filed on Sep. 20, 2006, now Pat. No. 7,843,449.

(51) Int. Cl.
    *H04N 13/04*      (2006.01)

(52) U.S. Cl.
    CPC ......... *H04N 13/047* (2013.01); *H04N 13/0402* (2013.01); *H04N 13/0459* (2013.01)

(58) Field of Classification Search
None
See application file for complete search history.

(56) References Cited

U.S. PATENT DOCUMENTS

| | | | | |
|---|---|---|---|---|
| 2,086,556 A * | 7/1937 | Jacobson | ............. | G03B 21/606 352/61 |
| 2,804,801 A * | 9/1957 | Mihalakis | ............. | G03B 21/602 359/459 |
| 4,649,425 A | 3/1987 | Pund | | |
| 5,024,521 A | 6/1991 | Zuchowski et al. | | |
| 5,065,236 A * | 11/1991 | Diner | ................................. | 348/54 |
| 5,311,220 A * | 5/1994 | Eichenlaub | ..................... | 348/55 |
| 5,528,263 A | 6/1996 | Platzker et al. | | |
| 6,023,277 A | 2/2000 | Osaka et al. | | |
| 6,061,179 A | 5/2000 | Inoguchi et al. | | |
| 6,215,594 B1 | 4/2001 | Inoguchi et al. | | |
| 6,220,709 B1 * | 4/2001 | Heger | ................................ | 353/8 |
| 6,421,174 B1 | 7/2002 | Ooshima et al. | | |
| 6,533,420 B1 | 3/2003 | Eichenlaub | | |
| 6,929,369 B2 | 8/2005 | Jones | | |
| 6,931,596 B2 * | 8/2005 | Gutta et al. | .................. | 715/728 |
| 6,985,290 B2 | 1/2006 | Putilin et al. | | |
| 6,999,071 B2 | 2/2006 | Balogh | | |
| 6,999,110 B2 | 2/2006 | Kobayashi | | |
| 7,002,642 B2 | 2/2006 | Jung | | |
| 7,016,116 B2 | 3/2006 | Dolgoff | | |
| 7,023,466 B2 | 4/2006 | Favalora et al. | | |
| 2003/0107712 A1 | 6/2003 | Perlin | | |

(Continued)

FOREIGN PATENT DOCUMENTS

| | | |
|---|---|---|
| JP | 7-140570 | 6/1995 |
| WO | WO-98/43126 | 10/1998 |
| WO | WO-2004/111913 | 12/2004 |

OTHER PUBLICATIONS

Neil A. Dodgson; Autostereoscopic 3D Displays; IEEE Computer Society; Aug. 2005.*

(Continued)

*Primary Examiner* — Carlos Perromat

(74) *Attorney, Agent, or Firm* — Fletcher Yoder PC

(57) ABSTRACT

A three-dimensional display system provides a projection screen having a predetermined angularly-responsive reflective surface function. Three-dimensional images are respectively modulated in coordination with the predetermined angularly-responsive reflective surface function to define a programmable mirror with a programmable deflection angle.

8 Claims, 6 Drawing Sheets

(56) References Cited

U.S. PATENT DOCUMENTS

| | | |
|---|---|---|
| 2004/0027451 A1 | 2/2004 | Baker |
| 2004/0252187 A1 | 12/2004 | Alden |
| 2004/0263969 A1 | 12/2004 | Lipton et al. |
| 2005/0093713 A1* | 5/2005 | Orme .................... G03B 35/14 340/815.4 |
| 2006/0012542 A1* | 1/2006 | Alden ............................ 345/32 |
| 2006/0109200 A1 | 5/2006 | Alden |
| 2007/0019067 A1 | 1/2007 | Tsubaki et al. |
| 2007/0133089 A1 | 6/2007 | Lipton et al. |

OTHER PUBLICATIONS

Bright, TV Before your Eyes, Popular Science, Sep. 2006, p. 24, New York.

Cotting et al., Proceedings of the Third IEEE and SCM International Symposium on Mixed and Augmented Reality (2004) pp. 100-109.

Halle, Autostereoscopic Displays and Computer Graphics, ACM SIGGRAPH, Computer Graphics, May 1997, pp. 58-62, 31(2).

Mone, Return of the 3-D, Popular Science, Jun. 2006, pp. 62-66, 68, 87, 90. vol. 268, #6, New York.

Invitation to Pay Additional Fees for PCT/US2007/079101, mailed Jun. 26, 2008, 6 pages.

International Search Report and Written Opinion for PCT/US2007/079101, mailed Jul. 16, 2008, 21 pages.

Notification of Reasons for Rejection (translation) for JP 2009-529407, mailed Aug. 31, 2011, 6 pages.

\* cited by examiner

AUTOSTEREOSCOPIC PROJECTION DISPLAY DEVICE WITH DIRECTIONAL CONTROL BASED ON USER'S LOCATION

CROSS-REFERENCE TO RELATED APPLICATION

The present application is a division of co-pending U.S. patent application Ser. No. 11/533,580, now U.S. Pat. No. 7,843,449, filed Sep. 20, 2006, entitled "THREE-DIMENSIONAL IMAGING and DISPLAY SYSTEM," the content of which is incorporated herein by reference in its entirety. This patent application is assigned to Apple Computer, Inc. In addition, the present application contains subject matter related to a co-pending U.S. patent application Ser. No. 11/255,348, filed Oct. 21, 2005, entitled "THREE-DIMENSIONAL IMAGING AND DISPLAY SYSTEM". This patent application is assigned to Apple Computer, Inc.

TECHNICAL FIELD

The present invention relates generally to visual display systems, and more particularly to a three-dimensional display system.

BACKGROUND ART

Modern three-dimensional ("3D") display technologies are increasingly popular and practical not only in computer graphics, but in other diverse environments and technologies as well. Growing examples include medical diagnostics, flight simulation, air traffic control, battlefield simulation, weather diagnostics, entertainment, advertising, education, animation, virtual reality, robotics, biomechanical studies, scientific visualization, and so forth.

The increasing interest and popularity are due to many factors. In our daily lives, we are surrounded by synthetic computer graphic images both in print and on television. People can nowadays even generate similar images on personal computers at home. We also regularly see holograms on credit cards and lenticular displays on cereal boxes.

The interest in 3D viewing is not new, of course. The public has embraced this experience since at least the days of stereoscopes, at the turn of the last century. New excitement, interest, and enthusiasm then came with the 3D movie craze in the middle of the last century, followed by the fascinations of holography, and most recently the advent of virtual reality.

Recent developments in computers and computer graphics have made spatial 3D images more practical and accessible. The computational power now exists, for example, for desktop workstations to generate stereoscopic image pairs quickly enough for interactive display. At the high end of the computational power spectrum, the same technological advances that permit intricate object databases to be interactively manipulated and animated now permit large amounts of image data to be rendered for high quality 3D displays.

There is also a growing appreciation that two-dimensional projections of 3D scenes, traditionally referred to as "3D computer graphics", can be insufficient for inspection, navigation, and comprehension of some types of multivariate data. Without the benefit of 3D rendering, even high quality images that have excellent perspective depictions still appear unrealistic and flat. For such application environments, the human depth cues of stereopsis, motion parallax, and (perhaps to a lesser extent) ocular accommodation are increasingly recognized as significant and important for facilitating image understanding and realism.

In other aspects of 3D display technologies, such as the hardware needed for viewing, the broad field of virtual reality has driven the computer and optics industries to produce better stereoscopic helmet-mounted and boom-mounted displays, as well as the associated hardware and software to render scenes at rates and qualities needed to produce the illusion of reality. However, most voyages into virtual reality are currently solitary and encumbered ones: users often wear helmets, special glasses, or other devices that present the 3D world only to each of them individually.

A common form of such stereoscopic displays uses shuttered or passively polarized eyewear, in which the observer wears eyewear that blocks one of two displayed images, exclusively one each for each eye. Examples include passively polarized glasses, and rapidly alternating shuttered glasses.

While these approaches have been generally successful, they have not met with widespread acceptance because observers generally do not like to wear equipment over their eyes. In addition, such approaches are impractical, and essentially unworkable, for projecting a 3D image to one or more casual passersby, to a group of collaborators, or to an entire audience such as when individuated projections are desired. Even when identical projections are presented, such situations have required different and relatively underdeveloped technologies, such as conventional autostereoscopic displays.

The consideration of freedom from headgear has thus motivated developments in autostereoscopic displays that automatically render a stereoscopic viewing experience for the observer without requiring the observer to use or wear special accommodations or devices. Autostereoscopic displays attempt to present a spatial image to a viewer without the use of glasses, goggles, or other personally-worn physical viewing aids. Autostereoscopic displays are appealing because they hold the prospect of offering the best experiential approximation to the optical characteristics of a real object.

Numerous autostereoscopic schemes for displaying images that actually appear three-dimensional have been proposed. Current physically realizable autostereoscopic displays can be classified generally into three broad categories: re-imaging displays, volumetric displays, and parallax displays.

Re-imaging displays typically capture and re-radiate the light from a three-dimensional object to a new location in space. Volumetric displays span a volume of space and illuminate individual parts of that space. Parallax displays are surfaces that radiate light of directionally varying intensity. Displays of each type have been used in commercial display systems, and each has inherent strengths and weaknesses.

The more common display approaches tend to fall into the two main categories of volumetric and parallax.

Autostereoscopic displays of the volumetric type produce 3D imagery by generating a collection of points within a volume that operate as light sources that emit, or appear to emit, light. If these points emit light isotropically, which is often the case, the resulting images appear ghosted or transparent. As a result, a typical volumetric display does not create a true 3D light field because the volume elements that are aligned depth-wise are not perceived to block one another. That is, the images do not display occlusion.

Autostereoscopic displays of the parallax type perform stereo separation of images internally, so that an observer is not required to use additional eyewear. A number of display systems of this type have been developed that present a different image to each eye as long as the observer remains in a fixed position in space. Most of these are variations on the parallax barrier method, in which a fine vertical grating or lenticular lens array is placed in front of a display screen. When the observer's eyes remain fixed at a certain location in space, each eye can only view one set of display pixels (even or odd) through the grating or lens array, and not the other set. This geometry can then ensure that each eye sees only its own respective image, corresponding to the set of pixels that display that distinct view of the image. The two image views, seen individually by the respective right and left eyes of the viewer, are configured so that the human visual system interprets the separately viewed images concurrently as a single 3D image. This occurs without the observer having to wear or use any personal assistive devices. However, the parallax barrier method typically requires the observer to remain stationary in one location. Further, in many cases, such displays generate a two-dimensional light field that provides horizontal but not vertical parallax.

A more recent and potentially much more realistic form of autostereoscopic display is the hologram. Holographic and pseudo-holographic displays output a partial light field that presents many different views simultaneously by effectively re-creating or simulating for the viewer the original light wavefront. The resulting imagery can be quite photorealistic, exhibiting occlusion and other viewpoint-dependent effects (e.g., reflection), as well as being independent of the viewer's physical position. In fact, the viewer can move around to observe different aspects of the image. The holographic image also has the potential to allow many observers to see the same image simultaneously.

Although much more realistic, a dynamically presented holographic image also requires far greater computational ability and bandwidth than is generally required for a two-view stereo display. Effective means are also noticeably wanting for dynamically recreating the original wavefront, or an acceptable facsimile thereof, in real time and at commercially acceptable costs.

Thus, a need still remains for highly effective, practical, efficient, uncomplicated, and inexpensive autostereoscopic 3D displays that allow the observer complete and unencumbered freedom of movement. Additionally, a need continues to exist for practical autostereoscopic 3D displays that provide a true parallax experience in both the vertical as well as the horizontal movement directions.

A concurrent continuing need is for such practical autostereoscopic 3D displays that can also accommodate multiple viewers independently and simultaneously. A particular advantage would be afforded if the need could be fulfilled to provide such simultaneous viewing in which each viewer could be presented with a uniquely customized autostereoscopic 3D image that could be entirely different from that being viewed simultaneously by any of the other viewers present, all within the same viewing environment, and all with complete freedom of movement therein.

Still further, due to the special user appeal but the daunting unsolved technical challenges, a distinctive need particularly continues for practical autostereoscopic 3D displays that provide a realistic holographic experience. Even more extraordinary would be a solution to the need for a holographic or pseudo-holographic viewing system that enables multiple simultaneous and individuated viewing as described above.

Yet another urgent need is for an unobtrusive 3D viewing device that combines feedback for optimizing the viewing experience in combination with provisions for 3D user input, thus enabling viewing and manipulation of virtual 3D objects in 3D space without the need for special viewing goggles or headgear.

In view of the ever-increasing commercial competitive pressures, increasing consumer expectations, and diminishing opportunities for meaningful product differentiation in the marketplace, it is increasingly critical that answers be found to these problems. Moreover, the ever-increasing need to save costs, improve efficiencies, improve performance, and meet such competitive pressures adds even greater urgency to the critical necessity that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a three-dimensional display system having a projection screen having a predetermined angularly-responsive reflective surface function. Three-dimensional images are respectively modulated in coordination with the predetermined angularly-responsive reflective surface function to define a programmable mirror with a programmable deflection angle.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
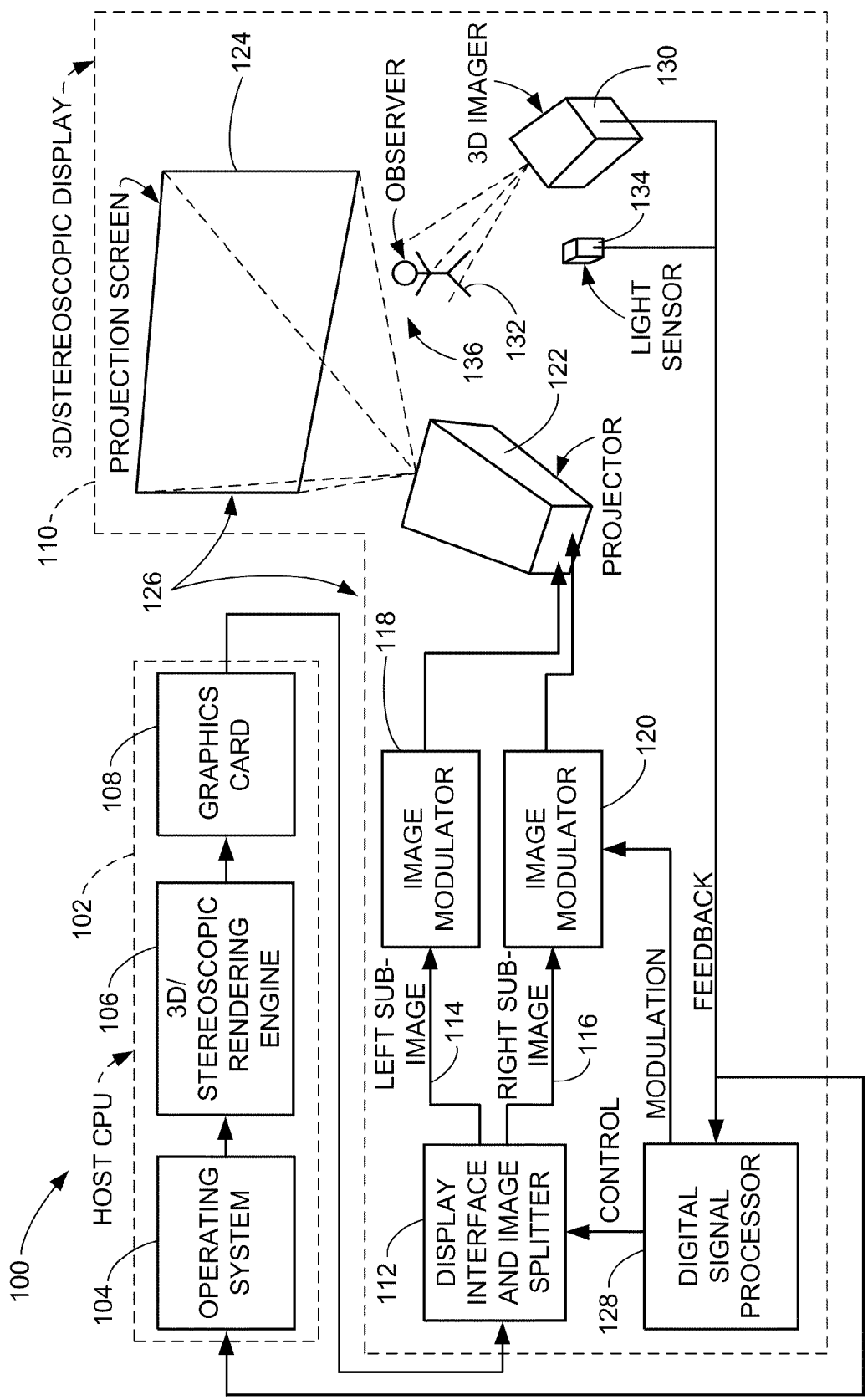
FIG. 1 is a functional block diagram and schematic illustration of a three-dimensional display system according to an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and operational steps are not disclosed in detail.

Likewise, the drawings showing embodiments of the system are semi-diagrammatic and not to scale and, particularly, some of the dimensions are for the clarity of presentation and are shown greatly exaggerated in the drawing FIGs. Similarly, although the views in the drawings for ease of description generally show similar orientations, this depiction in the FIGs. is arbitrary for the most part. Generally, the invention can be operated in any orientation.

In addition, where multiple embodiments are disclosed and described having some features in common, for clarity and ease of illustration, description, and comprehension thereof, similar and like features one to another will ordinarily be described with like reference numerals.

For expository purposes, the term "horizontal" as used herein is defined as a plane parallel to the plane of the observer's eyes, regardless of the observer's orientation. The term "vertical" refers to a direction perpendicular to the horizontal as just defined. Terms, such as "on", "above", "below", "bottom", "top", "side" (as in "sidewall"), "higher", "lower", "upper", "over", and "under", are defined with respect to the horizontal plane.

The present invention provides a three-dimensional ("3D") display system that delivers 3D human interface capability along with an unobtrusive and unencumbered 3D autostereoscopic viewing experience. No headgear needs to be worn by the observer. In one embodiment, the system of the present invention provides a stereoscopic 3D display and viewing experience; in another, it delivers a realistic holographic 3D display experience.

In accordance with certain embodiments of the present invention, the positions of one or more observers are also tracked in real time so that the 3D images that are being projected to the observers can be continually customized to each observer individually. The real time positional tracking of the observer(s) also enables 3D images having realistic vertical as well as horizontal parallax. In addition, each 3D image can be adjusted according to the observers' individually changing viewing positions, thereby enabling personally customized and individuated 3D images to be viewed in a dynamic and changeable environment. Further, the positional tracking and positionally responsive image adjustment enable synthetization of true holographic viewing experiences.

Thus, according to embodiments of the present invention, autostereoscopic display systems are disclosed that include, for example, building blocks such as:
- a two-dimensional ("2D") projector, including analog mirrors, a polygon scanner or similar device, and driver circuitry;
- a 3D imager (which may be part of the 2D projector);
- a projection screen having a surface function;
- a display interface;
- a digital signal processor ("DSP"); and
- a host central processing unit ("CPU") with 3D rendering capability.

It will be understood that these, and other associated building blocks and components, may be configured as stand-alone elements, or may be combined together in one or more assemblies, as needed or appropriate for the particular implementation at hand.

Referring now to FIG. 1, therein is shown a functional block diagram and schematic illustration of a three-dimensional ("3D") display system 100 according to an embodiment of the present invention. A host CPU 102 includes an operating system ("OS") 104, a 3D/stereoscopic rendering engine 106, a graphics card 108, and other components (not shown) as will be conventionally understood.

The 3D/stereoscopic rendering engine 106 renders 3D images (e.g., stereoscopic or pseudo-holographic) as further described hereinbelow, and may be implemented in firmware, software, or hardware, according to the particular implementation at hand. Accordingly, the 3D/stereoscopic rendering engine 106 may be part of a graphics card, such as the graphics card 108, part of a graphics chip, code running on a graphics chip's graphics processor unit ("GPU"), a dedicated application specific integrated circuit ("ASIC"), specific code running on the host CPU 102, and so forth. The choice of implementation will be clear to one of ordinary skill in the art based upon this disclosure and the related characteristics of the particular implementation at hand.

The 3D images that are rendered by the 3D/stereoscopic rendering engine 106 are sent to a 3D/stereoscopic display 110 through a suitable interconnect, such as an interconnect based upon the digital video interface ("DVI") standard. The interconnect may be either wireless (e.g., using an 802.11x Wi-Fi standard, ultra wideband ("UWB"), or other suitable protocol), or wired (e.g., transmitted either in analog form, or digitally such as by transition minimized differential signaling ("TMDS") or low voltage differential signaling ("LVDS")).

Figure 2:
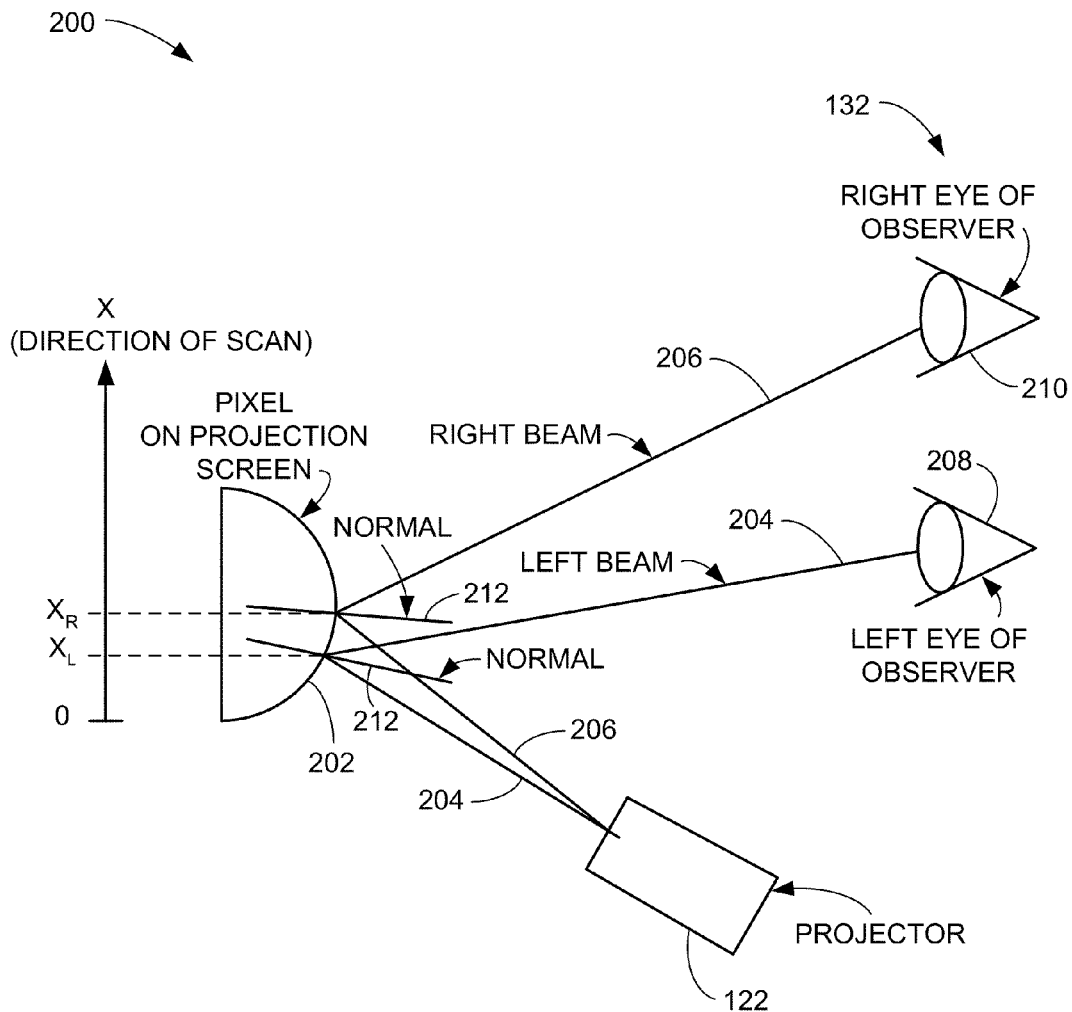
FIG. 2 is a depiction of a single pixel on the surface of the projection screen.

A display interface and image splitter 112 inside the 3D/stereoscopic display 110 divides the 3D images from the 3D/stereoscopic rendering engine 106 into two 3D sub-images, namely a left sub-image 114 and a right sub-image 116. The left and right sub-images 114 and 116 are modulated (including being turned on and off) in respective image modulators 118 and 120 to enable and control optical projection by a projector 122 of the left and right sub-images 114 and 116 respectively into the observer's left and right eyes 208 and 210, as depicted in FIG. 2. The observer's brain then combines the two projected optical sub-images 114 and 116 into a 3D image to provide a 3D viewing experience for the observer.

The deflection into the observer's respective left and right eyes is accomplished using a projection screen 124 according to embodiments of the present invention. The projection screen 124, in combination with image data properly modulated as disclosed and taught herein in accordance with the present invention, forms a mirror device 126 that is a programmable mirror with a programmable deflection angle. Broadly speaking, this combination then constitutes the projection screen as a programmable mirror that is a spatial filter, because the combination operates to cause light to reflect from the projection screen to the observer's particular left and right eyes as a function of the spatial locations of those respective eyes, and otherwise does not reflect light—as if the light were filtered out.

As broadly used herein, therefore, the term "programmable mirror" is defined to mean that the projection screen 124 and the modulated image data projected thereto and reflected therefrom, as disclosed herein, have deflection angles that can be programmably changed for a particular limited location on the projection screen 124, such as the location of a single pixel of the projected image. More generally, it is defined to mean that the deflection angles can be individually programmably controlled and changed for each of the reflection points (e.g., pixels) of as much as the entire projection screen 124. By this definition, therefore, the projection screen 124 does not have fixed deflection angles. Rather, the deflection angles (e.g., one for the observer's left eye 208 and one for the observer's right eye 210) can be programmed in real time to change as needed to follow changes in the observer's eye positions (e.g., due to changes in head tilt, head position, observer position, and so forth).

A digital signal processor ("DSP") 128 in combination with a 3D imager 130 is used to determine the correct location of an observer 132 (i.e., a user) with respect to the projection screen 124. Characteristics about the observer 132, such as the observer's head position, head tilt, and eye separation distance with respect to the projection screen 124 are also determined by the DSP 128 and the 3D imager 130. Based upon these determinations, appropriate changes are made to a modulation function for the image modulators 118 and 120, and/or to the deflection angle of the projector 122, to change the programmable deflection angle of the mirror device 126 to provide the observer 132 with the best 3D viewing experience without the need for 3D goggles or other obtrusive viewing means.

The 3D imager 130 may be any suitable scanner or other known device, as will be understood by those skilled in the art, for locating and determining the positions and characteristics of each observer 132. Such characteristics may include, for example, the heights of the observers 132, head orientations (rotation and tilt), arm and hand positions, and so forth. In one embodiment, the 3D imager will utilize light projected by the projector 122 and reflected from the projection screen 124 for this purpose, as described further hereinbelow. A particularly efficacious and cost-effective 3D imager can optionally be implemented, for example, by employing the teachings of co-pending U.S. patent application Ser. No. 11/255,348, filed Oct. 21, 2005, and assigned to the assignee of the present invention.

In some embodiments, the 3D imager 130 may be configured as an integral part of the projector 122. For example, the projector 122 may be configured to controllably directly illuminate the observer 132 as well as the projection screen 124. An appropriately located light sensor 134 is then positioned to pick up the illumination light that is reflected from the observer 132. The light sensor 134 may be, for example, a suitable, omnidirectional light sensor, since the 3D imager 130 (or optionally the projector 122, as described) controllably projects the illumination light at known, predetermined angles and elevations. The position of the observer 132 can then be determined by the angle and elevation of the projected illumination light from the 3D imager 130, and from the measured time-of-flight ("TOF") of the illumination light from the 3D imager 130 to the light sensor 134. Also, while the light sensor 134 is shown as a separate unit for ease of illustration, it can alternatively be incorporated into any of the other system components such as, for example, the 3D imager 130. Likewise, the 3D imager 130 and/or the light sensor 134 may advantageously be incorporated and/or integrated into the projector 122, optionally sharing common components therewith.

The 3D imager 130 and the light sensor 134 may also provide a means for observer input. For example, the volume in front of the projection screen 124 in which the observer 132 is positioned may be constituted by the 3D display system 100 as a virtual display volume 136 that is echoed as a 3D display on the projection screen 124. The virtual display volume 136 can then be used for observer input. In one embodiment, the observer 132 can then actuate, for example, a 3D representation of a button to activate certain features on a virtual active desktop (not shown). Such an active desktop would be represented virtually in the virtual display volume 136 and, by virtue of the 3D projection on the projection screen 124, would appear to the observer 132 as a 3D image in the virtual display volume 136 in the immediate presence and proximity of the observer 132. Other human interface behaviors are similarly possible, as will be understood by persons of ordinary skill in the art in view of the present disclosure.

Referring now to FIG. 2, therein is shown a depiction 200 of a single pixel 202 on the surface of the projection screen 124 (FIG. 1). Left and right light beams 204 and 206 are shown following paths from the projector 122 to the pixel 202 on the projection screen 124, and then back to the observer's left and right eyes 208 and 210, respectively. The left light beam 204 entering the observer's left eye 208 is a reflection of the projected light at pixel location $X_L$; the right light beam 206 entering the observer's right eye 210 is a reflection of the projected light at pixel location $X_R$. In one embodiment, the pixel surface is treated with a reflective material, such as polished silver or aluminum.

For each pixel 202, being dome-shaped in this embodiment, there is exactly one location $X_L$ and one location $X_R$ where the projected light beams 204 and 206 respectively reflect to enter the observer's respective left and right eyes 208 and 210. This is because the incident angle of the illuminating light beam from the projector 122 is equivalent to the reflected angle with respect to the normal 212 of the surface of the pixel 202 at the point where the incident light beam is reflected. (The normal 212 is a line perpendicular to the surface of the pixel 202 at the point where the incident light beam is reflected.) At that location or point of reflection (e.g., $X_L$ or $X_R$), only a small portion of the pixel 202 is going to reflect the light toward the observer's corresponding left eye 208 or right eye 210. Light from the projector that strikes any other portion of the pixel 202 will be reflected elsewhere than to that particular eye of the observer.

Therefore, since the normal 212 is perpendicular to the slope of the surface of the pixel 202 and the slope is not constant across the pixel 202, there is thus ideally only one location each, $X_L$ and $X_R$ respectively, at which the light is reflected into the corresponding left eye 208 and right eye 210 of the observer 132. If the observer 132 moves to another position, then new locations or points of reflection $X_L$ and $X_R$ will be required to cause the light to continue to be reflected appropriately to the observer's eyes. Similarly, additional observers at still other positions will each require their own unique reflection locations $X_L$ and $X_R$ on the pixel 202.

Accordingly, by properly modulating (turning on and off) the left and right light beams 204 and 206 as the projector 122 scans the projection screen 124 (FIG. 1), unique images can be sent respectively by the projector 122 to the left and right eyes 208 and 210 of the observer 132. This can be accomplished, for example, by projecting left eye image information to each pixel 202 on the projection screen 124 at the exact moments that the projector 122 is projecting toward the unique locations $X_L$, and projecting right eye image information at the exact moments that the projector 122 is projecting toward the unique locations $X_R$.

When used in this manner, the projection screen 124 then functions as and becomes a programmable mirror device with programmable deflection angle. That is, by programming the projector 122 to project to unique pixel locations $X_L$ and $X_R$ associated with particular respective deflection angles (e.g., the angles for projecting to the respective left and right eyes 208 and 210 of the observer 132), the deflection angles of the projection screen 124 are uniquely selected and controlled according to this programming. The projection screen 124 (depending upon its construction) is thus converted from an omni-directional reflection surface (for example) into a programmable mirror device with programmable deflection angle.

As shown and described below, it is useful in one embodiment to select a sinusoidal surface function for the projection screen 124. As used herein, the term "sinusoidal surface function" is defined as a surface topography on the projection screen 124 that varies sinusoidally as a function of displacement along at least one axis of the projection screen 124.

Figure 3:
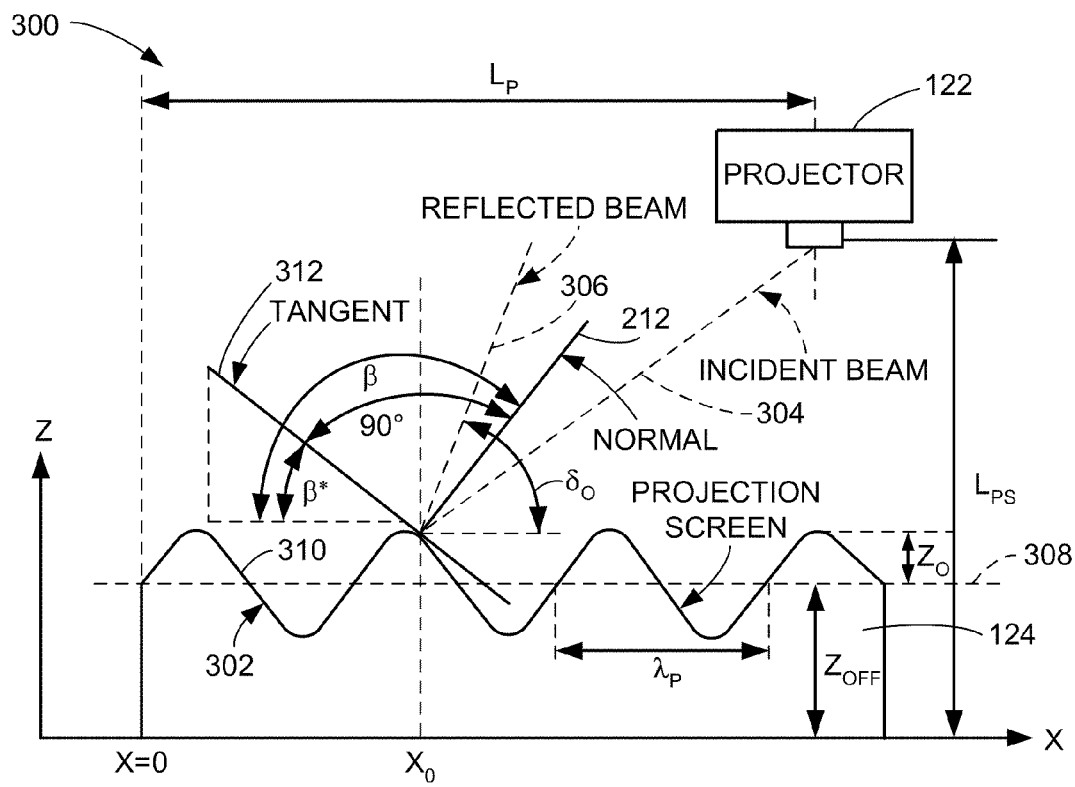
FIG. 3 is a depiction of a projection screen that has a surface function.

Referring now to FIG. 3, therein is shown a depiction 300 of a projection screen 124 that has a surface function 302. The surface function 302 in this embodiment is a sinusoidal surface function, whereby the surface topography varies sinusoidally, as generally depicted in FIG. 3, to present a continuously varying, known, and predictable deflection angle $\partial_O$ for the incident light beam 304. The deflection angle $\partial_O$ for the reflected light beam 306, measured with reference to the plane 308 of the projection screen 124, is thus a sinusoidal function of location or coordinates on the projection screen 124. In the depiction 300, the associated normal 212 of the projection screen 124 is shown as a function of horizontal displacement x, and similarly varies sinusoidally with x.

It will be understood that, although the surface function 302 in this embodiment is depicted as sinusoidal, the surface function 302 in a more general sense may be any appropriate function as long as it is well known or well defined. The surface function 302, as described in greater detail hereinbelow, is defined as a function that is predetermined (i.e., known and well defined), reflective (i.e., reflects light impinging thereupon), and angularly-responsive. Angularly-response is defined to mean that the angle at which the impinging light is reflected varies (i.e., is not constant) depending upon (i.e., as a function of) the location on the surface function to which the impinging light is directed, even if the actual angle of impingement of the light remains constant. The light's reflection angle is thus responsive ("angularly responsive") in a known and predictable manner to the location to which the light is aimed or directed. Accordingly, the projection screen 124 has a spatial filter (the surface function 302) that defines a predetermined angularly-responsive reflective surface function.

Although periodic surface functions and surface functions with smooth slope variations (e.g., curved topographies) are preferred, it is possible to have a sawtooth function, triangular function, irregular function, non-harmonic function, or any suitable arbitrary function, as long as the function is well defined. It may be well defined mathematically, or it may be well defined operationally as by scanning the projection screen 124 and mapping the resulting reflections, for example, into a correlation table.

Continuing to refer to FIG. 3, and then to FIG. 4, the deflection angle $\partial_O$ of the reflected light beam 306 as a function of x can be determined as follows.

The surface function 302 of the projection screen 124 relates the thickness (and hence the surface elevation) z(x) of the projection screen 124 to the horizontal displacement x along the screen surface 310 (which embodies the surface function 302) as follows:

$$z(x) = Z_0 \cdot \sin(k_0 \cdot x) + Z_{OFF} \quad \text{(Equation 1)}$$

$$k_0 = \frac{2 \cdot \pi}{\lambda_P}$$

Where:

$Z_0$ is the difference between $Z_{OFF}$ ("Z-Offset") and the maximum thickness ($Z_{OFF}+Z_0$) of the projection screen 124 ($Z_0$ thus being essentially the amplitude of the surface function), $Z_{OFF}$ is the average thickness of the projection screen 124, z(x) is the thickness of the projection screen 124 at location x, and $\lambda_P$ is the length of one pixel 202 (FIG. 2) ($\lambda_P$ thus being one 360° cycle of the sinusoid, which represents one complete period of the surface function).

To calculate the tangent or slope 312 as a function of x, (Equation 1) is differentiated with respect to x:

$$\frac{z(x)}{dx} = Z_0 \cdot k_0 \cdot \cos(k_0 \cdot x) \quad \text{(Equation 2)}$$

The angle β* is then calculated:

$$\tan(\beta^*(x)) = \frac{z(x)}{dx} = Z_0 \cdot k_0 \cdot \cos(k_0 \cdot x) \rightarrow \quad \text{(Equation 3)}$$

$$\beta^*(x) = \arctan(Z_0 \cdot k_0 \cdot \cos(k_0 \cdot x))$$

The angle β is the angle of the normal 212 with respect to the plane 308 of the projection screen 124. To get the angle β of the normal 212 as a function of position x, β can be calculated as follows:

$$\beta(x) = \beta^*(x) + 90 = \arctan(Z_0 \cdot k_0 \cdot \cos(k_0 \cdot x)) + 90 \quad \text{(Equation 4)}$$

Figure 4:
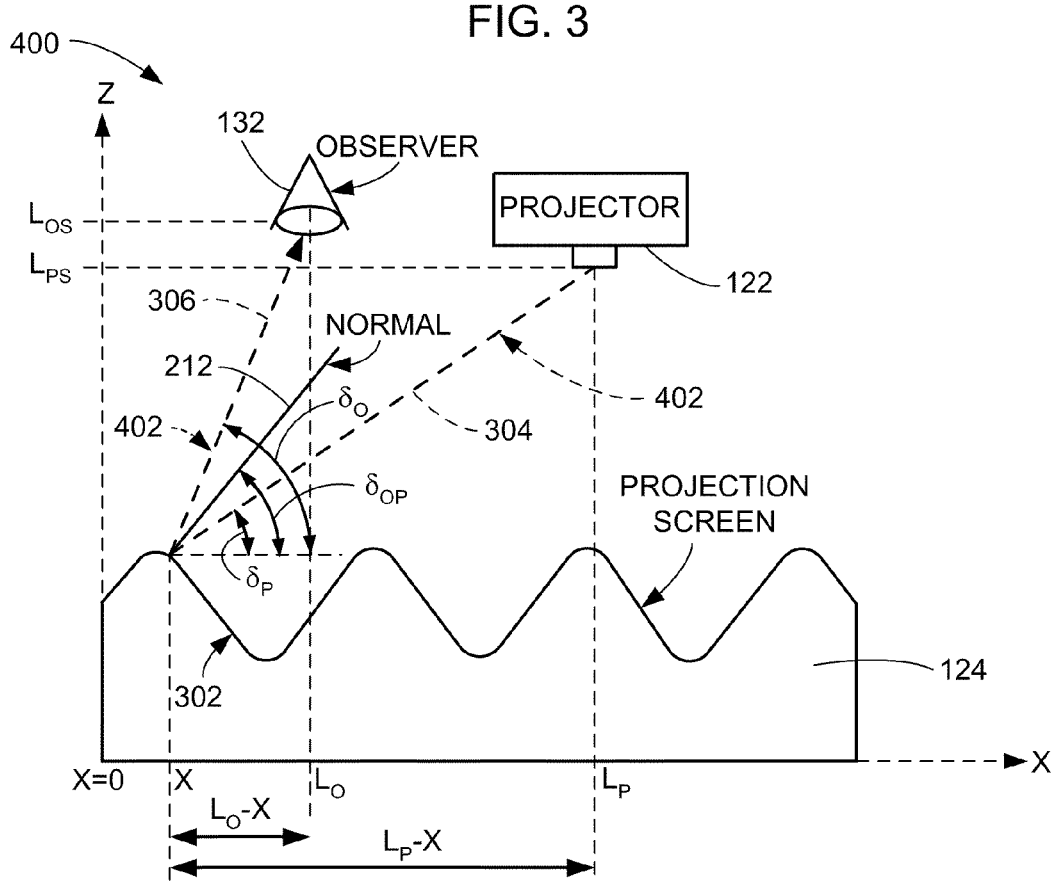
FIG. 4 is a depiction of a light path from the projector to an observer as a function of the projection screen's surface function.

Referring now to FIG. 4, therein is shown a depiction 400 of a light path 402 (consisting of the incident light beam 304 and the reflected light beam 306) from the projector 122 to the observer 132, as a function of the surface function 302 of the projection screen 124.

The angles $\partial_P$ and $\partial_O$ can be calculated as follows:

$$\tan(\delta_O) = \frac{L_O - x}{L_{OS} - Z_{OFF} + Z_0 \cdot \sin(k_0 \cdot x)} \rightarrow \delta_O = \quad \text{(Equation 5)}$$

$$\tan\left(\frac{L_O - x}{L_{OS} - Z_{OFF} + Z_0 \cdot \sin(k_0 \cdot x)}\right)$$

and $$\tan(\delta_P) = \quad \text{(Equation 6)}$$

$$\frac{L_P - x}{L_{PS} - Z_{OFF}} \rightarrow \delta_O = \tan\left(\frac{L_P - x}{L_{PS} - Z_{OFF} + Z_0 \cdot \sin(k_0 \cdot x)}\right)$$

With Equations 5 and 6, the angle of the normal with respect to the x-axis can now be calculated. Since angle $\partial_{OP}$ is exactly midway between $\partial_P$ and $\partial_O$, the normal as a function of x is:

$$\delta_{OP}(x) = \quad \text{(Equation 7)}$$

$$\frac{\delta_O + \delta_P}{2} = \frac{1}{2} \cdot \left( \begin{array}{c} \tan\left(\frac{L_P - x}{L_{PS} - Z_{OFF} + Z_0 \cdot \sin(k_0 \cdot x)}\right) + \\ \tan\left(\frac{L_O - x}{L_{OS} - Z_{OFF} + Z_0 \cdot \sin(k_0 \cdot x)}\right) \end{array} \right) + \frac{\pi}{2}$$

The locations at which the functions in $\partial_{OP}$ (Equation 7) and β(x) (Equation 4) intersect provide the modulation function as shown in the following MATLAB® (The MathWorks, Natick, Mass.) script:

```
%***************************************************
% MATLAB® script for the calculation of the modulation
% function
%***************************************************
%
% Initialize variables in mm
% Setup:
% Width of display: 500mm
% Location of projector: 250mm from left edge of display,
% 500mm away from projection screen
% Location of observer: 125mm from left edge of display,
% 500mm away from projection screen
% Average thickness of display: 10mm
% Pixel spacing: 25mm
% Pixel depth: 1mm
ZOFF = 10
Z0 = 1
lambdaP = 50
k0 = 360/lambdaP;
LO = 125
LP = 250
LPS = 500
LOS = 500
n = 0
flag = 0
% Define vectors
beta = zeros(1,500);
delta = zeros(1,500);
mod = zeros(1,500);
% Generate functions
for x = 1:1:500
    delta(x) = 0.5*(atand((LP−x)/(LPS−
        ZOFF+Z0*sind(k0*x)))+atand((LO−x)/(LOS−
        ZOFF+Z0*sind(k0*x))))+90;
    beta(x) = atand(Z0*k0*cosd(k0*x))+90;
end
% determine points that are common to both functions
for counter = 1:1:500
    mod(counter) = 0;
    if delta(counter) > beta(counter)
        if (flag == 0)
            mod(counter) = delta(counter);
            flag = 1;
        end
    else
        if (flag == 1)
            mod(counter) = delta(counter);
            flag = 0;
        end
    end
end
%***************************************************
% plot graphs
%***************************************************
% the red graph shows the angle of the normal when the
% screen is illuminated as a function of x
% the green graph shows the angle of the normal when
% observer is at location Lo, projector is at location Ls and
% the screen is illuminated as a function of x
% the blue graph shows the modulation function, the y axis
% showing the associated angle. Note that the modulation
% function has a constant amplitude of 1.
%***************************************************
x = 1:1:500
figure
plot (x,delta,'r')
hold on
plot(x,beta,'g')
title 'Angle of Normal as a function of x'
xlabel 'Screen location/mm'
ylabel 'Phase/degrees'
figure
plot(x,mod,'b')
title 'Modulation function as a function of x'
xlabel 'Screen location/mm'
ylabel 'Phase/degrees'
```

Although the sizes of the projection screen 124, the pixels 202, the projection distances, the viewing distances, and so forth, will depend upon the particular utilization at hand, the parameters in the above MATLAB® script are representative of one such embodiment. In this embodiment, the projector 122 is 500 mm away from the projection screen 124 and 250 mm from the left edge of the displayed image (not shown), the displayed image is 500 mm wide, the observer is 500 mm away from the projection screen 124 and 125 mm from the left edge of the displayed image, and the pixels 202 have a depth of 1 mm and spacing of 25 mm.

At the introduction above to the MATLAB® script, it was noted that the locations at which the functions in $\partial_{OP}(x)$ (Equation 7) and $\beta(x)$ (Equation 4) intersect provide the modulation function, which will now be described.

Figure 5:
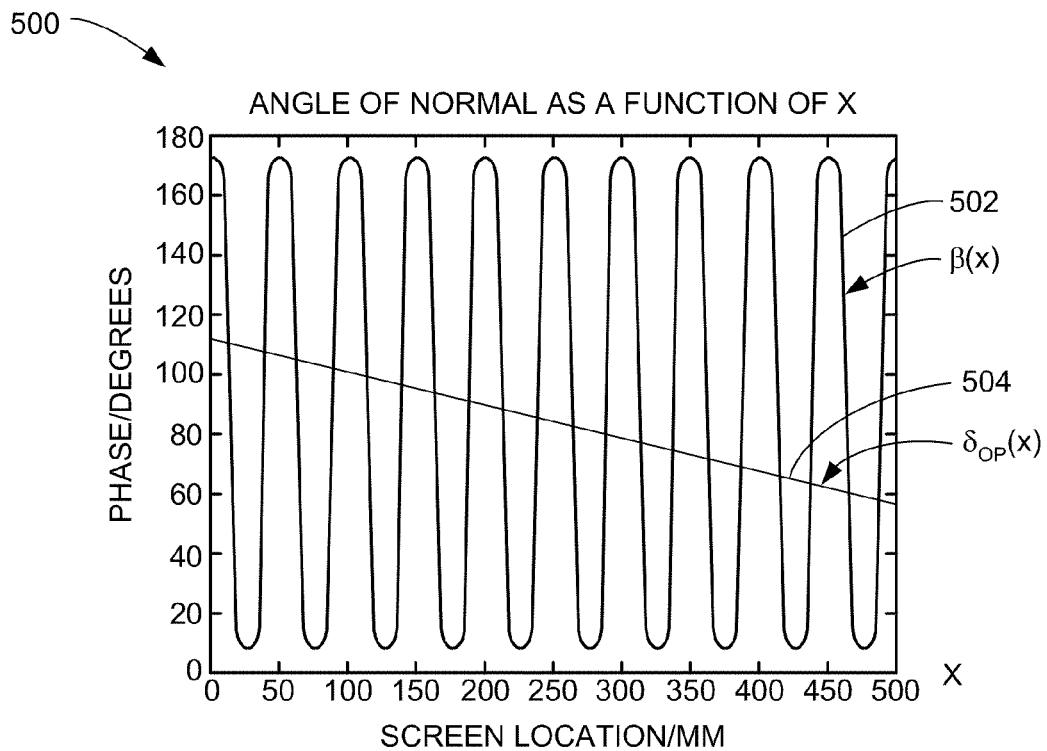
FIG. 5 is a graph showing the angle of the normal, and the correct aiming normal angle, as functions of the distance x.

Referring now to FIG. 5, therein is shown a graph 500 showing a curve 502 of $\beta(x)$, which is the angle of the normal 212 (FIG. 3) as a function of x.

Also shown in FIG. 5 is a curve 504 of $\partial_{OP}(x)$ (basically a straight line in this embodiment). The curve 504 shows that $\partial_{OP}$ changes gradually as a function of the distance x. It can be considered that $\partial_{OP}(x)$ corresponds to the angle of the normal 212 (FIG. 4) that is correct for aiming the reflected beam 306 into the eye of the observer 132, as a function of the distance x. (See FIG. 4).

Figure 6:
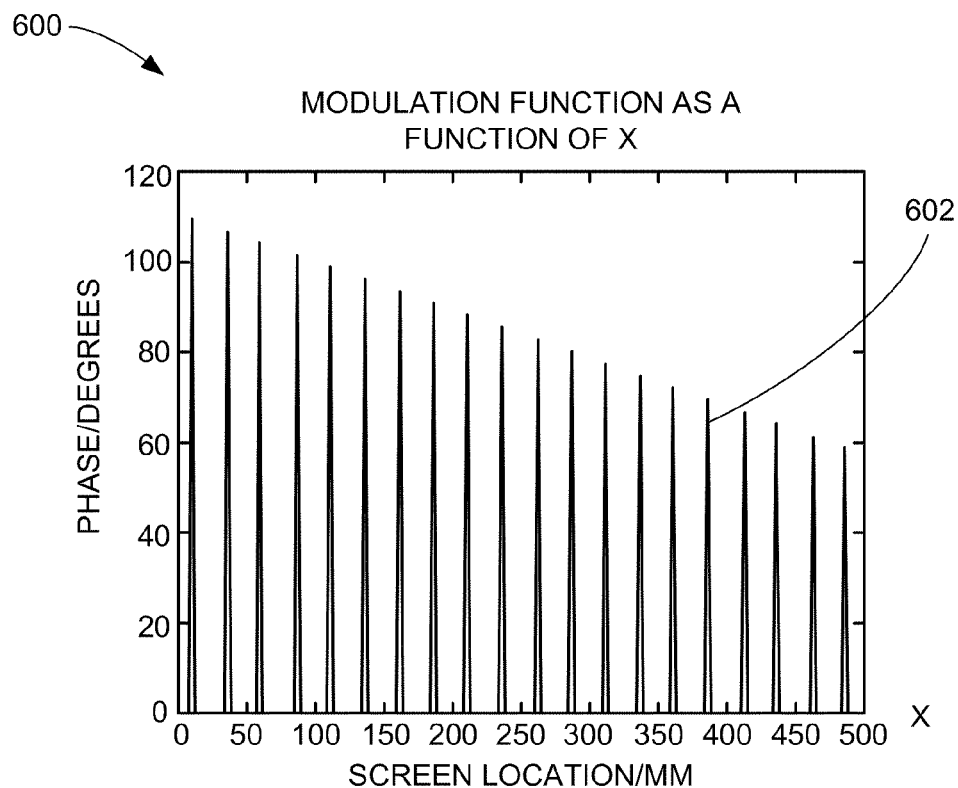
FIG. 6 is a graph of the modulation function as a function of the distance x.

Referring now to FIG. 6, therein is shown a graph 600 of the modulation function 602 as a function of the distance x. The modulation function 602 has a value of 1 at the intersections (as depicted in FIG. 5) of $\beta(x)$ and $\partial_{OP}(x)$, and a value of 0 elsewhere. There is a modulation function for the observer's left eye and a modulation function for the observer's right eye. The modulation functions are employed to turn the projector 122 on (modulation function value=1, for example) at the exact respective angles $\partial_P$ of the incident beam 304 (FIG. 4) that impinge on the surface function 302 of the projection screen 124 (e.g., at locations $X_L$ and $X_R$ as depicted in FIG. 2) to cause the incident beam to be reflected directly into the respective left and right eyes 208 and 210 of the observer 132. That is, each left or right modulation function controls and turns on the projection of its respective left or right image at the correct moments for reaching only the corresponding left or right eye. At other times, the projector 122 is off (modulation function value=0, for example) and no projection is made, thereby masking or gating out the projected beam (i.e., the incident beam 304) at those times when it is not aimed for reaching the observer's eyes.

It will be understood, of course, that the projected beam (e.g., the incident beam 304) does not necessarily need to be masked out as described, because when it is not aimed at the proper reflection points (e.g., $X_L$ and $X_R$) it will not be reflected directly to the observer's eyes. However, masking is preferred because commercially practical reflection surfaces are not perfect and reflection is typically not specular but instead exhibits some degree of diffuse reflection. Such diffuse reflection can degrade the image quality if the projected beam strikes locations other than the proper reflection points, as described.

Similar considerations suggest that the incident beam 304 should not only have a width less than the distance between the proper reflection points $X_L$ and $X_R$, but preferably considerably less, such as nominally no more than half that distance.

Figure 7:
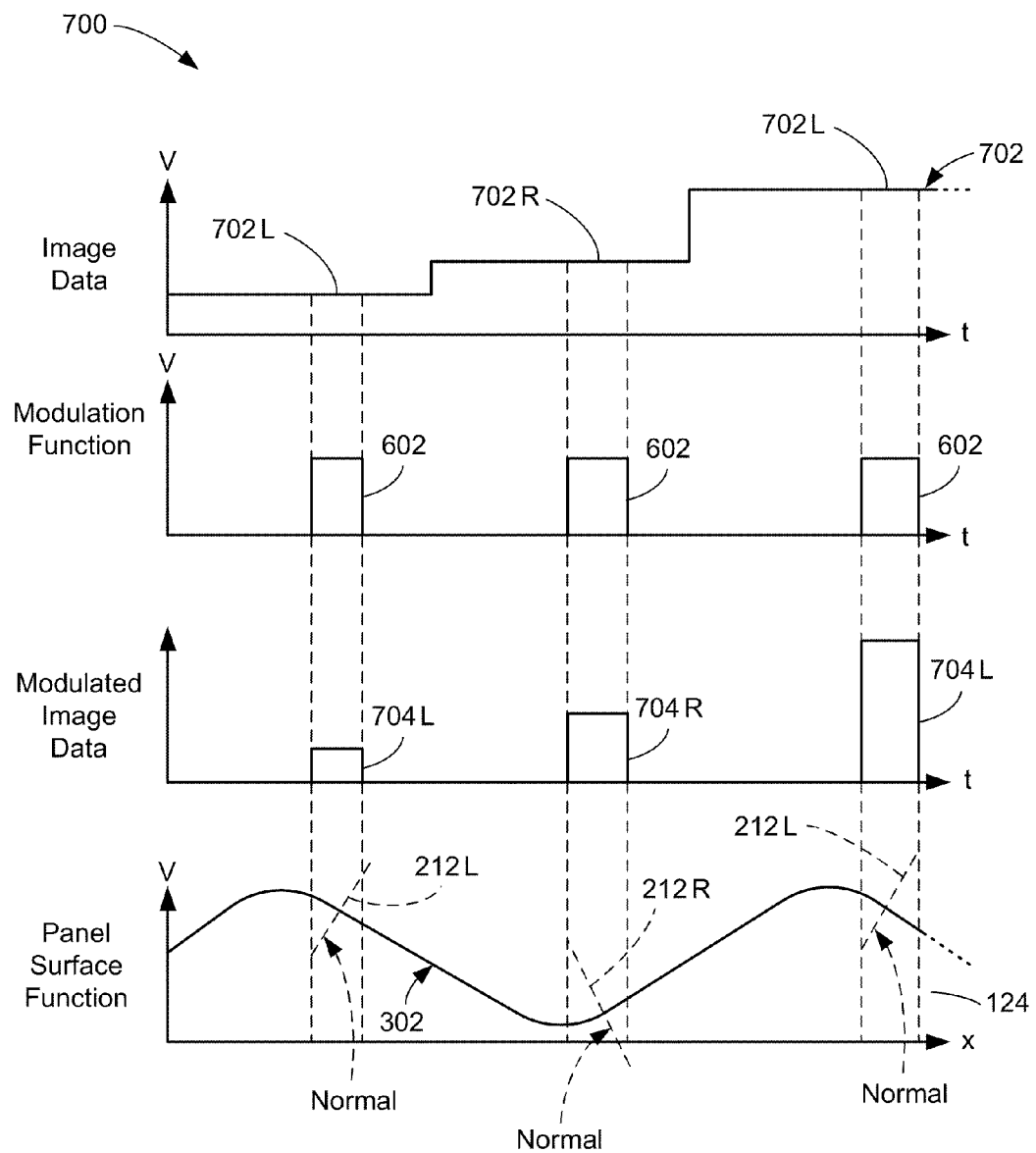
FIG. 7 is a graphical representation depicting the physical significance of the modulation function.

Referring now to FIG. 7, therein is shown a graphical representation 700 depicting the physical significance of the modulation function 602 shown in FIG. 6. In particular, FIG. 7 shows the relationship of the modulation function 602 to the surface function 302 of the projection screen 124, and the resulting controlled, synchronized transmission and inhibition of the incident light beam 304 (FIG. 4) from the projector 122.

In one embodiment, the incident light beam 304 is periodically swept across the surface of the projection screen 124. The periodic sweeping of the incident light beam 304 causes its path to change regularly (i.e., periodically) with time as it is swept across the projection screen 124. The position or displacement (x,y) of the incident light beam 304 is therefore a function of time t. (For simplicity of explanation, y is not shown.)

Accordingly, FIG. 7 relates time t with the physical movement or displacement x of the incident light beam 304 as it scans across the projection screen 124. With this correlation between t and x, a single pixel in the image being projected to the observer 132 can be related to one pixel of the surface function 302. Then, by properly modulating the image with the modulation function 602, it is possible to map out the specific portion of a pixel that relates to a particular normal 212 around which a desired reflection occurs to the selected eye of the observer 132. In one embodiment, the incident light beam 304 is accordingly switched on and off by the modulation function 602 as the incident light beam 304 periodically sweeps across the surface of the projection screen 124. As a result, exact respective 3D image information is thereby projected to the left and right eyes 208 and 210 (FIG. 2) of the observer 132.

Thus, an image data signal 702 depicting a representative image data signal is shown at the top of FIG. 7. The image data signal 702 may include, for example, a component 702L for the left sub-image 114 (FIG. 1) and a component 702R for the right sub-image 116. The corresponding image modulators 118 and 120 are then controlled by the modulation function 602 to modulate the left and right sub-images 114 and 116 and pass the respective image data signals 702 (i.e., 702L and 702R) to the projector 122 whenever the modulation function 602 has a value of 1. Similarly, when the modulation function 602 has a value of 0, no signal is passed to the projector 122. This causes the image data signal 702 to be modulated for projection by the projector 122 at only the precise moments when the angles of the incident beam 304 are correct in coordination with the surface function 302 to define respective discrete light paths 402 that cause the image data 702 and the left and right sub-images therein (114 and 116, represented by 702L and 702R) to be respectively spatially directed to reflect from the projection screen 124 individually and substantially exclusively to the locations of the respective left and right eyes 208 and 210 of the observer 132. The projected portions of the image data signal 702, as modulated by the modulation function 602, are accordingly depicted in FIG. 7 as projected portions 704L and 704R.

The bottom of FIG. 7 shows the corresponding portions of the surface function 302 of the projection screen 124. The relationships between x, t, the modulation function 602, and the corresponding normals 212L for the observer's left eye 208 and 212R for the observer's right eye 210 are represented. As explained earlier above, the normals 212 correlate and thereby specify the locations of the correct angles and projection targets for reflecting the incident light beam 304 to the observer's respective left and right eyes. It is at these locations (x) and corresponding times (t) that the modulation function 602 switches the projector 122 "on" with a modulation function value of 1, as described.

Accordingly, by properly modulating the image data 702 with the modulation function 602, respective spatial reflections for the left eye 208 and the right eye 210 are created. By angularly and intensity modulating the left and right sub-images 114 and 116 respectively in coordination with the angularly-responsive reflective surface function 302, the programmable mirror 126 with a programmable deflection angle is provided and defined.

Likewise, as explained further below, the 3D display system 100 can generate a spatial reflection for imaging purposes. The incident light beam 304 or the reflected light beam 306 can be used to image an object. More specifically, it can be used to determine the distance of a given object for a given deflection angle. In this particular mode, the 3D display system 100 would image it's field of view to create a map that would represent the distance of objects as a function of the vertical and horizontal displacement of the scanning beam in the device's field of view. In one embodiment, for example, after the beam leaves the projector 122, it is then deflected by the programmable mirror 126 on to the object (e.g., the observer 132) and then from the object into the light sensor 134. Based on the path delay of the modulated light beam, the DSP 128 can then calculate what the distance is that the light beam traveled, and thus the distance of the particular object being scanned. This feature facilitates calculation of the optimum deflection angle for giving the observer 132 the best possible stereoscopic viewing experience.

Based upon the present disclosure, it will now be understood that the modulation function 602 is not limited to modulating the image data 702. The modulation function 602 can also be used to modulate the scan velocity of the scanning beam (e.g., the incident light beam 304) in the horizontal and/or vertical directions. In one embodiment, for example, such an implementation keeps the projector "on" continuously and simply "jumps" the incident light beam 304 directly to each respective normal 212 location for the corresponding pixel that is to be projected at that moment to and from that pixel location to the selected and targeted eye of the observer.

It will be further understood that the modulation function 602 can be encoded into the surface of the projection screen 124 such that when scanning the projection screen 124 at constant velocity the appropriate target deflection angles $\partial_O$ are hit. This can be advantageous, for example, when the observer 132 is in a fairly stationary location. In certain such circumstances, the scanning beam can then be kept on continuously.

As shown above in accordance with the disclosures of the present invention, a mirror with programmable deflection angle $\partial_O$ can thus be provided by configuring a projection screen as disclosed herein in combination with a projected image beam that is modulated in accordance with the disclosures of the present invention.

As described above in connection with FIG. 1, the system 100 can be used for imaging one or more existing objects or observers by incorporating a pickup sensor, such as the 3D imager 130 and the light sensor 134 (FIG. 1), that evaluates light reflected by a physical object such as the observer 132. This enables the position and shape characteristics of that object to be determined. Determination of particular characteristics can readily be accomplished, for example, using known image recognition techniques. This enables the system 100, for example, to associate the left side of the observer's head with a left deflection angle for the left eye 208 and the right side of the observer's head with a right deflection angle for the right eye 210.

For an observer 132, it will be understood that such position and shape characteristics are needed to adjust the proper deflection angles $\partial_O$ of the projected light beam for the left and right images to assure that they correctly reach the observer's respective left and right eyes 208 and 210. Such an imaging capability for determining observer position and shape characteristics produces a feedback mechanism (e.g., the 3D imager 130 and the light sensor 134) in the system 100 that allows the observer to move in the vicinity of the projection screen 124 such that the system 100 then accommodates such movement and continuously tracks and follows the observer. In other words, the observer's movements are tracked to provide feedback that enables appropriate real time adjustments to be made so that the 3D images continue to be directed correctly and directly to the observer's left and right eyes as the observer moves and changes position.

Such feedback can also be utilized to define and track observer characteristics such as head orientation (rotation and tilt), arm, hand, and finger positions, and so forth, which may then be interpreted as feedback to provide system inputs for various observer-actuated control inputs. These control inputs, in turn, may be used to control operation of the 3D display system 100, to control and/or manipulate virtual objects in the virtual display volume 136, and so forth.

For example, the 3D display system 100 can present an unobtrusive 3D virtual desktop (not shown) to the observer 132 in the virtual display volume 136. The observer 132 is then able to manipulate objects within the desktop by reaching into the virtual display volume 136 and "grasping", "pushing", or otherwise manipulating the virtual objects as if they were actually present (which they appear to be). The manipulation of the virtual objects occurs because the feedback mechanism recognizes observer movements, such as finger movements, at the locations of the virtual objects and reconfigures the display of the virtual objects in response thereto.

More generally, therefore, the virtual display volume 136 serves as a virtual volume for 3D interactions. Such 3D interactions and user interfaces ("UIs") may be in conjunction with 3D stereoscopic projection and viewing, or 3D holographic (or pseudo-holographic, as described further hereinbelow) projection and viewing.

In one detecting and feedback embodiment, for example, when illuminating the observer 132 with light from the projector 122 for detection by the light sensor 134, each image frame projected by the projector 122 may be divided into 3 sub frames:

a projected left image sub frame, which is a frame of the left 3D sub-image (i.e., the left sub-image 114) of the 3D stereoscopic image that is designated for the left eye 208 (FIG. 2) of the observer 132;

a projected right image sub frame, which is a frame of the right 3D sub-image (i.e., the right sub-image 116) of the 3D stereoscopic image that is designated for the right eye 210 of the observer 132; and a projected scan image sub frame, which is a frame that illuminates the observer 132 to determine and locate the observer's actual location and orientation.

In such an embodiment, projecting the scan image sub frame thus occurs in concert with projecting the left and right 3D sub-images.

The scan image sub frame may be utilized to sweep the entire target area in which the observer is being tracked, or when the observer's general position is known, the projected beam during the scan image sub frame may be directed more specifically to that general, known position to illuminate the observer 132. Alternatively, the observer 132 may be illuminated indirectly by reflecting light from the projection screen 124 onto the observer. The reflected light from the observer 132 may then be used to create a 3D profile of the observer 132 and to define the relationship between the observer 132 and the projection screen 124. This relationship may be defined, for example, as the distance z between the observer and the projection screen, and the x,y,z locations of various observer characteristics (such as eye locations) in a corresponding x,y plane that is parallel to the plane of the projection screen 124 at distance z therefrom. The number and the rate of the scan image sub frames may be fixed, or may be adaptive depending upon and in response to the degree and rate of movement of the observer 132.

As described earlier, the imaging of existing objects and/or observers in the vicinity of the projection screen 124 may be provided by the projector 122 or by a separate imager such as the 3D imager 130, and the light sensor 134 may be incorporated thereinto or located separately therefrom.

Figure 8:
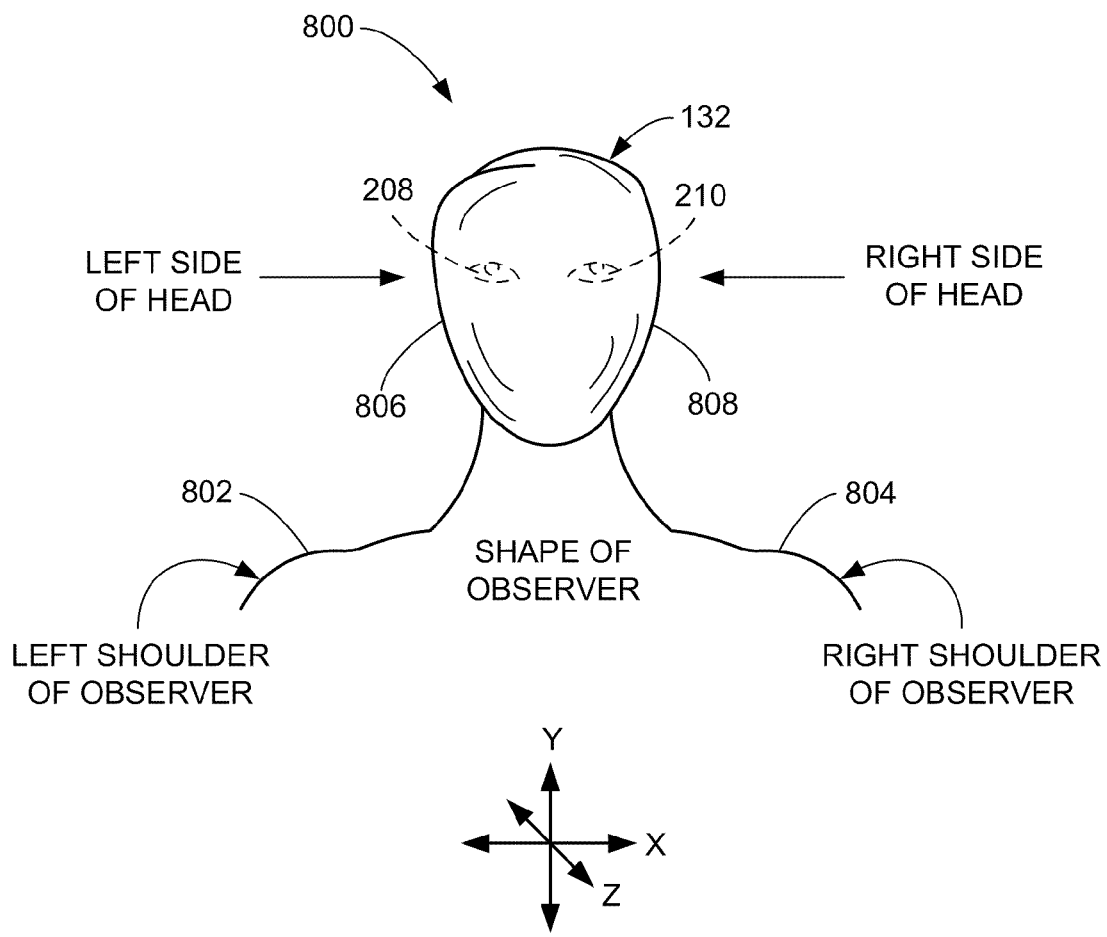
FIG. 8 shows a simplified shape of the observer as appearing to the digital signal processor.

Referring now to FIG. 8, therein is shown a simplified shape 800 of the observer 132 as the observer's shape may appear to the DSP 128 (FIG. 1) after being imaged by the 3D imager 130 using suitable image recognition methodologies, as are known. Suitable image recognition in the DSP 128 has then identified the left and right shoulders 802 and 804 of the observer 132. The left and right sides 806 and 808 of the observer's head have also been identified, as have the corresponding locations of the observer's left and right eyes 208 and 210 (which, if not visible to the 3D imager 130, can be identified by interpolating from the identified locations of other head features such as the left and right sides 806 and 808). Suitable data and procedures for enabling eye position interpolation may be stored, for example, with the DSP 128.

FIG. 8 depicts the simplified shape 800 of the observer as it relates to the x, y, and z axes, discussed just above. In this respect, the observer 132 is recognized as facing the projection screen 124 (not shown in FIG. 8), with the observer's back to the 3D imager 130, and in proximity with the projection screen 124. (See FIG. 1.)

Utilized in this manner, the simplified shape 800 of the imaged observer 132 is then used to determine the precise locations of the left and right sides 806 and 808 of the observers' head to properly determine (e.g., interpolate) the positions of the observer's left and right eyes 208 and 210. The positional eye information is then used by the system 100 to correctly adjust the deflection angles $\partial_O$ of the left and right images, respectively, to reach the observer's left and right eyes 208 and 210 at the determined (interpolated) eye positions. Further, when the observer 132 moves, the system 100 tracks this movement, tracks the movement of the observer's eye locations, and properly determines (interpolates) the new eye positions to adjust the left and right sub-images in response to the tracked movements. As explained further hereinbelow, adjusting the left and right sub-images in response to the tracked movements enables images to be produced that mimic a hologram It will now be further appreciated and understood by one of ordinary skill in the art, based upon the disclosures herein, that the present invention can simultaneously accommodate multiple observers collectively using the 3D display system 100 at the same time. When such multiple observers are present, the 3D imager 130 or other scanning system (as described earlier above) continuously and simultaneously detects and defines the individual shapes and locations of each of the multiple observers. Then the modulation function 602 and the image data signal 702 are suitably modified to track the locations and orientations of each of the multiple users to enable and control the appropriate unique and individual image data streams and spatial reflections related to each individual observer. In this manner, it is readily possible to simultaneously provide a unique and personal 3D visual experience to each individual observer, with each visual experience (i.e., projected image) selectively being similar or different from the others, as desired.

In addition, the image recognition can be implemented to distinguish between observers and non-observers, so that images are projected only to the desired targets (i.e., to the actual observers that are present) having, for example, certain predetermined defining characteristics enabling them to be distinguished accordingly.

Still further, individual observers 132 can not only be individually distinguished, detected, and tracked, but they can be uniquely identified based upon distinctive personal characteristics (e.g., height, shoulder width, distinctive outline, etc.). Personalized observer preferences can then be stored and associated with each such observer. Then, for example, upon entering the environment of the 3D display system 100, the system would recognize such an observer 132 and customize that observer's experiences according to the unique preferences and parameters associated therewith. Examples would include automatically authenticating the observer, personally greeting the observer upon arrival, providing a customized desktop for just that observer, providing customized control responses (e.g., responses to head movements) for that observer, resuming the 3D display where it had been previously stopped, and so forth.

A valuable and advantageous feature of the present invention is automatic alignment ("auto-alignment"). The auto-alignment feature of the present invention enables automatic proper alignment between the projector 122, the 3D imager 130 (if separate from the projector 122), the projection screen 124, and the observer 132. In one embodiment, the auto-alignment feature utilizes the projector 122 as sensor when the 3D imager and light sensor are incorporated into the projector 122. In another embodiment, the auto-alignment feature utilizes a separate 3D imager and sensor such as the 3D imager 130 and/or the light sensor 134.

With the auto-alignment and calibration feature, the DSP 128 and the 3D imager, such as the 3D imager 130, not only determine the observer's location, but also the location of the projection screen 124. This is accomplished by scanning the projection screen 124 similarly to the scanning of the observer 132. Such scanning determines the exact relative positions and dimensions of the projection screen 124, the observer 132, and the projector 122. The DSP 128 then appropriately adjusts (calibrates or recalibrates) the modulation function 602 in accordance with the updated and current screen positions and/or coordinates as thus determined by such auto-calibration. If desired or needed, the auto-alignment calibration can be repeated periodically to assure continuing alignment even in the event that the location of the projection screen 124 or other components should change. Such auto-calibration assures that the observer 132 will be provided with the very best viewing experience.

Based upon the disclosure herein, it will now also be understood that even individual pixels on the projection screen 124 may be individually calibrated by suitably scanning the projection screen 124 and recording the projection angles that return the projection beam to a particular location such as the light sensor. Then, knowing the surface function 302 of the projection screen and knowing the location of the light sensor, the modulation function 602 can be readily calculated and specified, based thereon, for projecting uniquely to any other location, such as to the observer's particular left and right eyes 208 and 210.

An exceptional aspect of the present invention is that it can produce viewing experiences that are virtually indistinguishable from viewing a true hologram. Such a "pseudo-holographic" image is a direct result of the ability of the present invention to track and respond to observer movements. By tracking movements of the eye locations of the observer, the left and right 3D sub-images are adjusted in response to the tracked eye movements to produce images that mimic a real hologram. The present invention can accordingly continuously project a 3D image to the observer that recreates the actual viewing experience that the observer would have when moving in space (e.g., within the virtual display volume 136) around and in the vicinity of various virtual objects displayed therein. This is the same experiential viewing effect that is afforded by a hologram. It allows the observer, for example, to move around a virtual object and to observe multiple sides thereof from different angles, whereas an ordinary 3D image will present a 3D perspective but will not accommodate movement relative to (e.g., around) the viewed objects. The pseudo-holographic images projected by the present invention dynamically change the 3D view of the objects in the same manner as a true hologram by detecting and following (i.e., tracking) the observer's actual movement in space and properly recreating the viewed 3D image in response thereto to imitate actual movement around such virtual object(s).

A powerful and unexpected extension of the pseudo-holographic capabilities of the present invention is holographic acceleration. With holographic acceleration, as taught herein, the apparent movement of the observer is increased by a selected factor by causing the pseudo-holographic images to move relative to the observer correspondingly faster than the observer's actual movement or displacement. For example, when moving around an object, the object will then appear to rotate faster than the actual movement around it by the observer. When moving in a straight line, the movement relative to the projected image will appear to be faster than the actual movement of the observer. The degree of acceleration of the images may be selected, for example, by the observer, and is then readily implemented by the 3D display system 100.

Holographic acceleration is particularly advantageous in the environment of the present invention because the virtual display volume 136 is finite in its extent, and the observer is facing the projection screen 124. When the projection screen 124 is flat, for example, it is then not practical for the observer to actually physically walk all the way around a virtual object. But with holographic acceleration, the observer can accomplish the same effect by moving in only a small arc around the object and, while doing so, observing the object rotate as if the observer were traversing a much greater arc. Such a viewing experience is not presently possible with an actual hologram, and is thus a distinct and unexpected advantage of the present invention.

Figure 9:
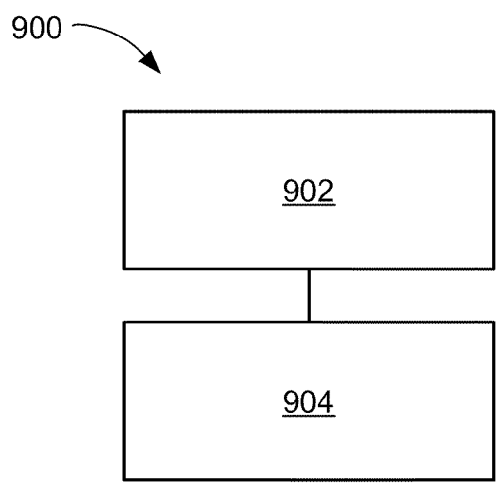
FIG. 9 is a flow chart of a three-dimensional display system in accordance with an embodiment of the present invention.

Referring now to FIG. 9, therein is shown a flow chart of a three-dimensional display system 900 in accordance with an embodiment of the present invention. The three-dimensional display system 900 includes providing a projection screen having a predetermined angularly-responsive reflective surface function, in a block 902; and modulating 3D images respectively in coordination with the predetermined angularly-responsive reflective surface function to define a programmable mirror with a programmable deflection angle, in a block 904.

It has been unexpectedly discovered that the present invention thus has numerous aspects.

A principle such aspect is that the present invention provides a highly effective, practical, efficient, uncomplicated, and inexpensive autostereoscopic display that allows the observer complete and unencumbered freedom of movement.

Another important such aspect is that the present invention provides a true parallax experience in both the vertical as well as the horizontal movement directions.

Still another important such aspect is that the present invention provides practical autostereoscopic displays that can also accommodate multiple observers independently and simultaneously.

A particular important such aspect of the present invention is that it affords such simultaneous viewing wherein each observer can be presented with a uniquely customized autostereoscopic image that can be entirely different from that being viewed simultaneously by the other observers present, all within the same viewing environment, and all with complete freedom of movement therein.

Another particularly important such aspect of the present invention is that it enables and provides for practical autostereoscopic displays that provide a realistic holographic experience. Even more surprisingly, the holographic or pseudo-holographic viewing solutions according to the present invention enable multiple simultaneous and individuated viewing.

Another important such aspect of the present invention is that it enables and provides for an unobtrusive 3D viewing system that combines feedback for optimizing the viewing experience in combination with provisions for 3D observer/user input, thus enabling viewing and manipulation of 3D objects in 3D space without the need for special viewing goggles or headgear.

Yet another such important aspect of the present invention is that it valuably supports and services the historical trend of reducing costs, simplifying systems, and increasing performance.

These and other such valuable aspects of the present invention consequently further the state of the technology to at least the next level.

Thus, it has been discovered that the 3D display system of the present invention furnishes important and heretofore unknown and unavailable solutions, capabilities, and functional aspects for visual display systems, and especially 3D autostereoscopic and pseudo-holographic display systems. The resulting system configurations are straight-forward, cost-effective, uncomplicated, highly versatile and effective, can be surprisingly and unobviously implemented by adapting known technologies, and are thus fully compatible with conventional manufacturing processes and technologies.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method for displaying three-dimensional images, the method comprising:
    tracking movement of the eye locations of an observer;
    projecting left and right three-dimensional pseudo-holographic sub-images on a curvilinear projection screen comprising two points of reflection within a pixel, wherein the two points of reflection reflect the left and right three-dimensional pseudo-holographic sub-images toward the respective left and right eye locations of the observer, wherein the left sub-images are not reflected toward the right eye location of the observer and the right sub-images are not reflected toward the left eye location of the observer, wherein the two points of reflection change with observer movement based at least in part on a continuous function of a surface of the curvilinear projection screen; and
    adjusting the left and right sub-images in response to the tracked movements to produce pseudo-holographic images that mimic a hologram.

2. The method as claimed in claim 1 further comprising providing holographic acceleration by increasing the apparent movement of the observer by causing the pseudo-holographic images to move relative to the observer correspondingly faster than the observer's actual movement.

3. The method as claimed in claim 1 further comprising:
    determining the relationship between the observer and a projection screen as the distance z between the observer and the projection screen; and
    determining the x,y,z locations of predetermined observer characteristics in at least one corresponding x,y plane that is parallel to the plane of the projection screen at distance z therefrom.

4. The method as claimed in claim 1 further comprising constituting a predetermined virtual display volume in front of the observer as a virtual volume for three-dimensional interactions in conjunction with three-dimensional pseudo-holographic projection and viewing.

5. A three-dimensional display system, comprising:
    an imager for tracking movement of the eye locations of an observer; and
    a projector for projecting left and right three-dimensional pseudo-holographic sub-images on a curvilinear projection screen comprising two points of reflection within a pixel, wherein the two points of reflection reflect the left and right three-dimensional pseudo-holographic sub-images toward the respective left and right eye locations of the observer, wherein the left sub-images are not reflected toward the right eye location of the observer, wherein the right sub-images are not reflected toward the left eye location of the observer, wherein the two points of reflection change with observer movement based at least in part on a continuous function of the curvilinear projection screen, and wherein the projector is configured to adjust the left and right sub-images in response to the tracked movements to produce pseudo-holographic images that mimic a hologram.

6. The system as claimed in claim 5 wherein the projector adjusts the left and right sub-images to produce holographic acceleration, wherein holographic acceleration is greater apparent movement of the observer-than the observer's actual movement.

7. The system as claimed in claim 5 wherein the imager is configured to track the movement of the eye locations of an observer based at least in part upon x,y,z locations of predetermined observer characteristics, wherein z is the distance between the observer and the projection screen and wherein x and y comprise a plane that is parallel to the plane of the projection screen at the distance z therefrom.

8. The system as claimed in claim 5 further comprising a predetermined virtual display volume in front of the observer constituted as a virtual volume for three-dimensional interactions in conjunction with three-dimensional pseudo-holographic projection and viewing.

* * * * *